(12) United States Patent
Tagami et al.

(10) Patent No.: US 6,246,544 B1
(45) Date of Patent: Jun. 12, 2001

(54) MAGNETIC DISK DRIVE

(75) Inventors: Katsumichi Tagami; Shinzo Tsuboi; Katsumi Suemitsu, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/196,737

(22) Filed: Nov. 20, 1998

(30) Foreign Application Priority Data

Nov. 21, 1997 (JP) .................................................. 9-320815

(51) Int. Cl.$^7$ ...................................................... G11B 5/66
(52) U.S. Cl. .............................................................. 360/135
(58) Field of Search ................................ 360/135, 234.7, 360/122, 234.8, 237.1, 246.1, 246.2, 246.5; 428/694 R, 694 PR, 694 T, 694 BP, 694 BR, 694 JC

(56) References Cited

U.S. PATENT DOCUMENTS

| | | | |
|---|---|---|---|
| 4,127,884 | * 11/1978 | Nouchi et al. | 360/119 |
| 5,041,932 | 8/1991 | Hamilton | 360/104 |
| 5,210,673 | * 5/1993 | Ito et al. | 360/135 |
| 5,569,518 | * 10/1996 | Hayashi | 28/64.1 |
| 5,673,161 | 9/1997 | Yanagisawa et al. | 360/103 |
| 5,800,931 | * 9/1998 | Lee et al. | 428/611 |
| 5,822,153 | * 10/1998 | Lairson et al. | 360/104 |
| 5,834,085 | * 11/1998 | Lairson et al. | 428/65.3 |
| 5,936,801 | * 8/1999 | Boutaghou et al. | 360/103 |
| 5,991,119 | * 11/1999 | Boutaghou et al. | 360/103 |
| 5,995,324 | * 11/1999 | Haddock et al. | 360/103 |

FOREIGN PATENT DOCUMENTS

| | | |
|---|---|---|
| 53129988 | 11/1978 | (JP) . |
| 6-28656 | 2/1994 | (JP) . |
| 6259739 | 9/1994 | (JP) . |
| 7210815 | 8/1995 | (JP) . |
| 8263819 | 10/1996 | (JP) . |
| 9-251635 | 9/1997 | (JP) . |
| 9293217 | 11/1997 | (JP) . |
| 10-3636 | 1/1998 | (JP) . |

* cited by examiner

*Primary Examiner*—David L. Ometz
*Assistant Examiner*—Angel Castro
(74) *Attorney, Agent, or Firm*—Foley & Lardner

(57) ABSTRACT

A magnetic disk drive for recording and reproducing data out of a magnetic disk with a magnetoresisive (MR) head contacting the disk is disclosed. When the MR device is spaced from the surface of the medium by a recess of less than 15 nm inclusive, the surface of the medium is provided with a sheet resistance of less than 5 $\Omega/cm^2$ inclusive. When the sheet resistance is greater than 5 $\Omega/cm^2$, the recess is selected to be 16 nm or above. To enhance a frequency characteristic, the surface of the disk is provided with an undulation period of greater than 2 $\mu m$ inclusive in the direction of movement of a head and a surface roughness of less than 1 nm inclusive. With this configuration, the disk drive obviates electrical faults ascribable to the sliding contact of the head and disk.

4 Claims, 3 Drawing Sheets

| MEDIUM | SUBSTRATE | PROTECTION FILM (nm)/ MAGNETIC FILM (nm)/ BACK LAYER (nm) | RESISTANCE ($\Omega/\square$) | MR DEVICE WITH 5nm RECESS | MR DEVICE WITH 15nm RECESS | MR DEVICE WITH 17nm RECESS |
|---|---|---|---|---|---|---|
| MEDIUM 1 | GLASS | C(10nm)/CoCrTaPt(2nm)/Cr(5nm)/NiP(2000nm)/Cu(5nm) | 1.2 | NO RESISTANCE CHANGE | NO RESISTANCE CHANGE | NO RESISTANCE CHANGE |
| MEDIUM 2 | GLASS | C(10nm)/CoCrTaPt(2nm)/Cr(5nm)/CoTa(500nm) | 2.8 | NO RESISTANCE CHANGE | NO RESISTANCE CHANGE | NO RESISTANCE CHANGE |
| MEDIUM 3 | GLASS | C(5nm)/CoCrTaPt(2nm)/Cr(20nm)/TiMo(1800nm) | 1 | NO RESISTANCE CHANGE | NO RESISTANCE CHANGE | NO RESISTANCE CHANGE |
| MEDIUM 4 | GLASS | C(5nm)/CoCrTaPt(2nm)/CrTi(100nm)/TiTa(5000nm) | 0.5 | NO RESISTANCE CHANGE | NO RESISTANCE CHANGE | NO RESISTANCE CHANGE |
| MEDIUM 5 | SILICON | C(5nm)/CoCrTaPt(2nm)/CoCr(50nm)/TiSi(50nm) | 2.5 | NO RESISTANCE CHANGE | NO RESISTANCE CHANGE | NO RESISTANCE CHANGE |
| MEDIUM 6 | CARBON | C(5nm)/CoCrTaPt(2nm)/CoCr(20nm)/TiTa(40nm) | 0.045 | NO RESISTANCE CHANGE | NO RESISTANCE CHANGE | NO RESISTANCE CHANGE |
| MEDIUM 7 | CONDUCTIVE GLASS | C(5nm)/CoCrTaPt(2nm)/CoCr(10nm)/CrTi(20nm) | 0.06 | NO RESISTANCE CHANGE | NO RESISTANCE CHANGE | NO RESISTANCE CHANGE |
| MEDIUM 8 | NiP-COVERED ALUMINUM | C(5nm)/CoCrTaPt(2nm)/CoCr(5nm) | 0.00012 | NO RESISTANCE CHANGE | NO RESISTANCE CHANGE | NO RESISTANCE CHANGE |
| MEDIUM 9 | GLASS | C(5nm)/CoCrTaPt(2nm)/Cr(150nm)/TiTai(150nm) | 5 | NO RESISTANCE CHANGE | NO RESISTANCE CHANGE | NO RESISTANCE CHANGE |
| MEDIUM 10 | GLASS | C(10nm)/CoCrTaPt(2nm)/Cr(150nm) | 10 | INFINITE | INFINITE | NO RESISTANCE CHANGE |

Fig. 3

| MEDIUM | SUBSTRATE | PROTECTION FILM (nm)/ MAGNETIC FILM (nm)/ BACK LAYER (nm) | RESISTANCE (Ω/□) | MR DEVICE WITH 5nm RECESS | MR DEVICE WITH 15nm RECESS | MR DEVICE WITH 17nm RECESS |
|---|---|---|---|---|---|---|
| MEDIUM 1 | GLASS | C(10nm)/CoCrTaPt(2nm)/Cr(5nm)/NiP(2000nm)/Cu(5nm) | 1.2 | NO RESISTANCE CHANGE | NO RESISTANCE CHANGE | NO RESISTANCE CHANGE |
| MEDIUM 2 | GLASS | C(10nm)/CoCrTaPt(2nm)/Cr(5nm)/CoTa(500nm) | 2.8 | NO RESISTANCE CHANGE | NO RESISTANCE CHANGE | NO RESISTANCE CHANGE |
| MEDIUM 3 | GLASS | C(5nm)/CoCrTaPt(2nm)/Cr(20nm)/TiMo(1800nm) | 1 | NO RESISTANCE CHANGE | NO RESISTANCE CHANGE | NO RESISTANCE CHANGE |
| MEDIUM 4 | GLASS | C(5nm)/CoCrTaPt(2nm)/CrTi(100nm)/TiTa(5000nm) | 0.5 | NO RESISTANCE CHANGE | NO RESISTANCE CHANGE | NO RESISTANCE CHANGE |
| MEDIUM 5 | SILICON | C(5nm)/CoCrTaPt(2nm)/Cr(50nm)/TiSi(50nm) | 2.5 | NO RESISTANCE CHANGE | NO RESISTANCE CHANGE | NO RESISTANCE CHANGE |
| MEDIUM 6 | CARBON | C(5nm)/CoCrTaPt(2nm)/CoCr(20nm)/TiTa(40nm) | 0.045 | NO RESISTANCE CHANGE | NO RESISTANCE CHANGE | NO RESISTANCE CHANGE |
| MEDIUM 7 | CONDUCTIVE GLASS | C(5nm)/CoCrTaPt(2nm)/CoCr(10nm)/CrTi(20nm) | 0.06 | NO RESISTANCE CHANGE | NO RESISTANCE CHANGE | NO RESISTANCE CHANGE |
| MEDIUM 8 | NiP-COVERED ALUMINUM | C(5nm)/CoCrTaPt(2nm)/CoCr(5nm) | 0.00012 | NO RESISTANCE CHANGE | NO RESISTANCE CHANGE | NO RESISTANCE CHANGE |
| MEDIUM 9 | GLASS | C(5nm)/CoCrTaPt(2nm)/Cr(150nm)/TiTai(150nm) | 5 | NO RESISTANCE CHANGE | NO RESISTANCE CHANGE | NO RESISTANCE CHANGE |
| MEDIUM 10 | GLASS | C(10nm)/CoCrTaPt(2nm)/Cr(150nm) | 10 | INFINITE | INFINITE | NO RESISTANCE CHANGE |

Fig. 4

| MEDIUM | UNDULATION PERIOD (μm) | SURFACE ROUGHNESS Ra(nm) | RECORDING DENSITY D20(KFCI) |
|---|---|---|---|
| MEDIUM 11 | 50 | 1 | 350 |
| MEDIUM 12 | 10 | 1 | 320 |
| MEDIUM 13 | 2 | 1 | 310 |
| MEDIUM 14 | 2 | 2 | 260 |
| MEDIUM 15 | 1 | 1 | 250 |
| MEDIUM 16 | 0.5 | 2 | 245 |

MAGNETIC DISK DRIVE

BACKGROUND OF THE INVENTION

The present invention relates to a magnetic disk drive and, more particularly, to a magnetic disk drive including a magnetoresistive (MR) device.

In a magnetic disk drive having a dense recording capability, a magnetic head records or reproduces data in or out of a magnetic disk while flying several nanometers (nm) above the disk. To further promote dense recording with such a disk drive, it is necessary to reduce a spacing between the head and the disk. To meet this requirement, U.S. Pat. No. 5,041,932 and Japanese Patent Application Nos. 7-65795, 8-055869 and 8-150968, for example, each discloses a system for recording data in a magnetic disk with a magnetic head contacting the disk. The system uses a three-pad slider in the mass domain of a head currently used in a flying head type recording system, and uses a lubricant. Particularly, U.S. Pat. No. 5,041,932 teaches that a magnetic head device is implemented by an induction type magnetic head. However, the current trend in the flying head type recording system is toward an MR head capable of further increasing the recording density.

An MR type magnetic head, however, brings about the following problems when recording or reproducing data in contact with the surface of a magnetic disk. When the disk includes a glass substrate, various faults ascribable to the sliding contact of the disk and including an increase in the resistance of an MR device and the damage of the device occur. The disk drive therefore lacks in durability. Further, when use is made of a magnetic disk customary with a flying head type recording system, sufficient contact and therefore dense recording cannot be implemented. Particularly, in the case of contact recording, the recording and reproducing characteristics are deteriorated due to the undulation of the disk. The flying head type recording system is not susceptible to the slow undulation of a disk other than the fine roughness of the disk.

Technologies relating to the present invention are also disclosed in, e.g., Japanese Patent Laid-Open Publication No. 6-28656.

SUMMARY OF THE INVENTION

It is therefore an object of the present invention to provide a contact recording type magnetic disk drive capable of obviating electrical faults ascribable to the sliding contact of an MR head and a magnetic disk.

A magnetic disk drive of the present invention includes a magnetic recording med i um having a contact surface. A magnetic head includes a slider and an MR device. The slider contacts the contact surface of the medium before the MR device reproduces data out of the medium. The medium has a sheet resistance of less than 5 $\Omega/cm^2$ inclusive, as measured on the contact surface. The MR device is spaced from the contact surface by a recess of 15 nm. Alternatively, the MR device may be spaced from the contact surface of the medium by a recess of greater than 15 nm inclusive.

BRIEF DESCRIPTION OF THE DRAWINGS

The above and other objects, features and advantages of the present invention will become more apparent from the following detailed description taken with the accompanying drawings in which:

FIG. 3 is a table listing the results of measurement effected with Example 1 of the illustrative embodiment; and FIG. 4 is a table listing the results of measurement effective with Example 2 of the illustrative embodiment.

DESCRIPTION OF THE PREFERRED EMBODIMENT

Figure 1:
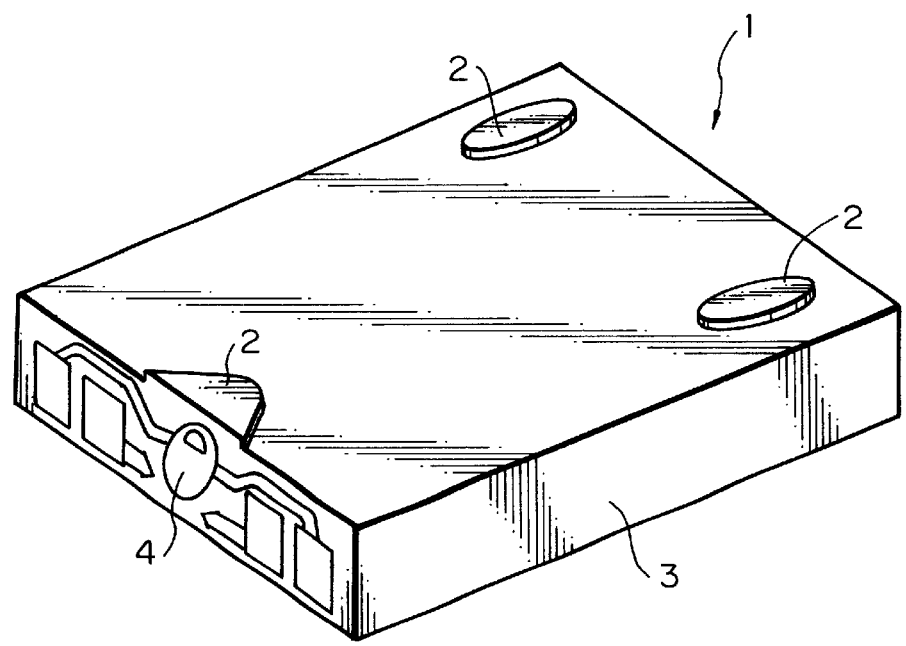
FIG. 1 is a perspective view showing a contact type thin film inductive/MR composite head included in a magnetic disk drive embodying the present invention.

Referring to FIG. 1, a magnetic head included in a magnetic disk drive embodying the present invention is shown. As shown, the head, generally 1, includes a slider 3, three pads 2 formed on the surface of the slider 3 expected to contact a magnetic disk or medium, and an electromagnetic transducer 4 having a gap adjoining the above surface of the slider 3. One of the pads 2 has a semicircular shape and is positioned at the rear side in the direction of movement of the head. The other two pads 2 are positioned at the front side in parallel with the front edge of the above surface of the slider 3, as illustrated.

The electromagnetic transducer 4 is implemented as a composite transducer including an induction type transducing device for recording and an MR device for reproduction, although not shown specifically. The slider 3 may have a 30% size by way of example. The MR device may be of either one of a horizontal bias type and a vertical bias type extensively used today.

Figure 2:
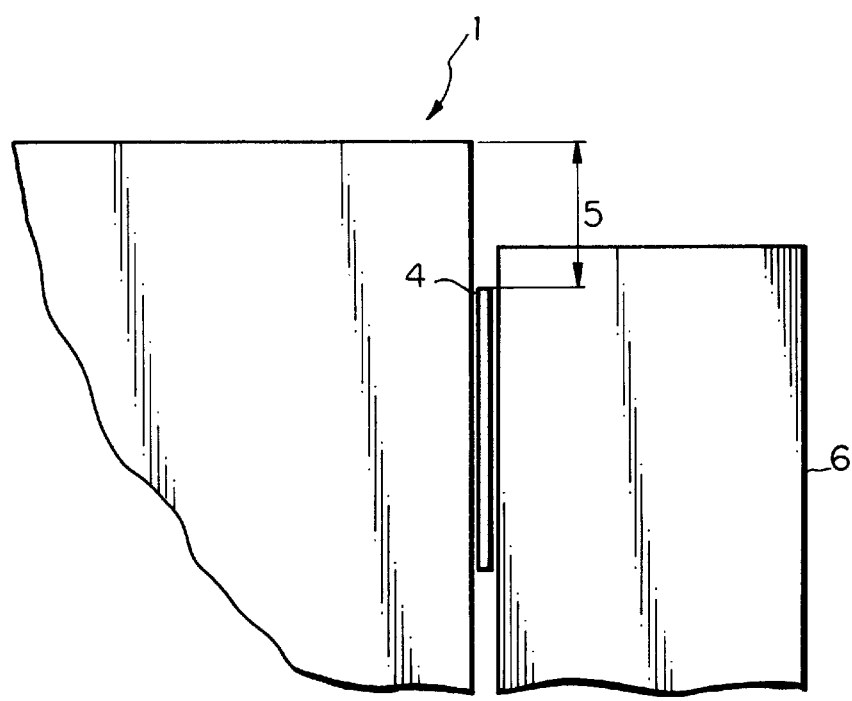
FIG. 2 is a section showing the rear portion of a slider included in the head of FIG. 1.

FIG. 2 is a section showing the rear end portion of the slider 3 including the transducer 4. As shown, the transducer 4 is held between the slider 3 and an alumina layer 6 and ground or otherwise machined to be spaced from the surface of a medium by a recess 5. Specific examples of the illustrative embodiment will be described hereinafter.

EXAMPLE 1

A plurality of magnetic heads each having the above configuration were prepared. The MR devices of the electromagnetic transducers 4 had recesses of 5 nm, 10 nm and 15 nm, respectively. FIG. 3 lists media, or magnetic disks, each having a particular configuration and used in combination with the above magnetic heads. As shown, a medium 1 includes a substrate formed of alkaline-reinforced glass customarily used for a flying record head. A Cu film was formed on the substrate by sputtering, and then an NiP layer was formed by plating and mirror-polished. Subsequently, a Cr layer and a CoCrTaPt layer were sequentially formed by sputtering. Further, a C layer was formed by sputtering as a protection layer. Finally, a DOL lubricant was applied to the medium 1 to a thickness of 5 nm. The sheet resistance on the surface of the medium 1 was measured and is shown in FIG. 3. For the measurement, use was made of Rorestar AP (MCP-T400) (trade name) available from Mitsubishi Petrochemical Co., Ltd. and a four-terminal scheme.

Media 2–4 differ from the above medium M1, as follows. The media 2–4 each additionally included a low resistance layer for reducing the surface resistance of the contact surface of the head or additionally includes a Cr film or back layer for reducing the sheet resistance to 5 $\Omega/cm^2$ or below. A medium 5 included a silicon substrate and had a laminate structure shown in FIG. 3. A medium 6 included a carbon substrate and had a configuration customary with a flying record head. A medium 7 included a conductive glass substrate and also had a configuration customary with a flying record head. A medium 8 included a substrate produced by plating an Al alloy substrate with NiP and then mirror-polishing it. Media 9 and 10 each included a glass substrate customary with a flying record head. A 5 nm thick DOL lubricant layer was formed on each of the media 2–10.

FIG. 3 lists the sheet resistances of the contact surfaces of the media 1–10 and the variations of the resistances of the MR devices measured after 24 hours of recording and reproduction. As FIG. 3 indicates, the variation of the resistance of the MR device depends on the amount of the recess, i.e., the distance between the contact surface of the medium and the MR device. In the MR devices with recesses smaller than 15 nm inclusive, the resistances of the MR devices do not change even when combined with the media having sheet resistances below 5 $\Omega/cm^2$ inclusive. The resistance of the MR device with a recess of 17 nm or above does not change when combined with the media customarily used for a flying record head.

EXAMPLE 2

A plurality of magnetic disks all having the configuration of the medium 2 of Example 1, but each having a particular surface undulation period, were prepared. The words "undulation period" refer to the period of slow undulation formed on the contact surface of a disk with a long period. FIG. 4 lists the undulation periods of the disks.

For recording and reproduction, use was made of the head of Example 1 having a composite device. The magnetic film of the MR device has a product of residual flux density and film thickness (Br δ) of 80 gauss micron and a coercive force of 2,500 Oe (oersted). The head was caused to slide for reproduction at the peripheral speed (V) of 5 m/s on each medium so as to measure a recording/reproduction frequency characteristic. The MR head has a shield gap length of 0.18 μm. FIG. 4 shows the frequencies F (MHz) of the outputs that were 20% of isolated waves, in terms of recording densities (KFCI). The recording densities are produced by 50.8×(F/V).

As FIG. 4 indicates, the record/reproduce head of Example 1 achieves a desirable recording density characteristic with media 11, 12 and 13 each having an undulation period of 2 μm or above in the direction of movement of the head (radial direction) and a surface roughness (Ra) of 1 nm or below.

In summary, it will be seen that the present invention provides an MR magnetic disk drive capable of preventing, when an MR device is combined with a magnetic recording medium having a particular sheet resistance, the resistance and other characteristics of the MR device from varying. Therefore, the disk drive of the present invention exhibits a stable reproduction characteristic over a long period of time. Moreover, only if the medium is provided with an undulation period lying in a particular range, a desirable dense recording characteristic is achievable with a magnetic head including an MR device and an induction type electromagnetic transducing device.

Various modifications will become possible for those skilled in the art after receiving the teachings of the present disclosure without departing from the scope thereof.

What is claimed is:

1. A magnetic disk drive comprising:
   a magnetic recording medium having a contact surface; and
   a magnetic head including a slider and an MR device, wherein said slider contacts said contact surface of said magnetic recording medium before said MR device reproduces data out of said magnetic recording medium;
   wherein said magnetic recording medium has a sheet resistance of less than 5 $\Omega/cm^2$ inclusive, as measured on said contact surface.

2. A magnetic disk drive as claimed in claim 1, wherein said magnetic recording medium includes a glass substrate.

3. A magnetic disk drive as claimed in claim 2, wherein said glass substrate comprises a conductive glass substrate.

4. A magnetic disk as recited in claim 1 wherein said MR device is spaced from said contact surface by a recess of 15 nm.

* * * * *